US006714487B2

(12) United States Patent
Schafroth et al.

(10) Patent No.: US 6,714,487 B2
(45) Date of Patent: Mar. 30, 2004

(54) WATCH MOVEMENT WITH A MICROGENERATOR AND METHOD FOR TESTING WATCH MOVEMENTS

(75) Inventors: Konrad Schafroth, Beuer (CH); Eric Maerki, Theswil (CH)

(73) Assignee: Conseils et Manufacture VLG S.A., Neuchatel (CH)

( * ) Notice: Subject to any disclaimer, the term of this patent is extended or adjusted under 35 U.S.C. 154(b) by 43 days.

(21) Appl. No.: 10/045,940

(22) Filed: Oct. 19, 2001

(65) Prior Publication Data

US 2002/0060954 A1 May 23, 2002

Related U.S. Application Data

(63) Continuation of application No. PCT/CH00/00179, filed on Mar. 27, 2000.

(51) Int. Cl.[7] .............................. G04F 5/00; G06F 1/04; G04B 1/00; G04B 29/00

(52) U.S. Cl. ........................ 368/157; 368/160; 368/203; 368/204; 368/322

(58) Field of Search ................................. 368/155, 157, 368/160, 203, 204, 220, 322–324, 76, 80, 88, 327, 326

(56) References Cited

U.S. PATENT DOCUMENTS

| | | | | | |
|---|---|---|---|---|---|
| 2,700,273 | A | * | 1/1955 | Godat | |
| 3,590,575 | A | * | 7/1971 | Eckenrode | |
| 4,496,246 | A | * | 1/1985 | Ota et al. | 368/88 |
| 4,711,584 | A | | 12/1987 | Tanazawa et al. | |
| 6,124,649 | A | * | 9/2000 | Schafroth | 310/40 MM |

OTHER PUBLICATIONS

Frei & Borel Internet site catalog, 2000, pp 6–7.*

* cited by examiner

*Primary Examiner*—Vit W. Miska
(74) *Attorney, Agent, or Firm*—Pearne & Gordon LLP

(57) ABSTRACT

Watch movement in which the rotor of a generator (10, 11, 13) is driven by a spring over a plurality of wheels (51, 61, 71) and pinions (50, 60, 70), the operation of the generator being regulated by an electronic regulating circuit (81).

Said wheels and pinions are all electrically grounded to avoid spark discharges which can be produced by the charging of voltages through frictional electricity.

31 Claims, 2 Drawing Sheets

WATCH MOVEMENT WITH A MICROGENERATOR AND METHOD FOR TESTING WATCH MOVEMENTS

This application is a continuation application of PCT/CH00/00179 filed on Mar. 27, 2000.

FIELD OF THE INVENTION

The present invention concerns a watch movement, in particular a watch movement with a microgenerator. The present invention also concerns a method for testing such watch movements.

RELATED ART

Watch movements with a microgenerator have been described notably in the patent documents CH597636 (Ebauches SA) and EP0851322 (Ronda SA). In such a watch movement, the balance known from mechanical watch movements is replaced by a generator 10–22 (FIG. 2) and an electronic regulating circuit 81 with a quartz oscillator 85. The generator is driven by a spring (not represented) over a part of the gear train 50, 60, 70 (FIG. 1). The generator feeds the electronics that in turn regulate the rotational speed of the generator and thus the running of the watch movement. Such watch movements therefore combine the advantages of a mechanical clock with the precision of a quartz watch.

The forces, moments and rotational speeds that are effective in such a watch movement correspond roughly to those in a mechanical clock. Thus, it is to be expected that the wear would be more or less the same.

The present invention is based on the observation that is surprisingly not the case. In such watches, strong signs of wear appear after a short time.

It has been observed, for example, that the oil in the jewel bearings deteriorates within a short time period. Furthermore, strong signs of wear have been noticed at the addendums of the teeth.

Wear has also been noticed in places where the teeth never touch, for example precisely at the teeth cusps. A lot of abrasion has also been found in the oil on the jewel bearings. The faster the wheel rotates, the stronger the destruction of the oil at the bearings of the corresponding wheel.

It is one aim of the invention to build a watch movement with a microgenerator that does not show these problems.

It is another aim of the invention to construct a watch movement with a microgenerator that is at least as durable as a conventional mechanical watch movement.

It is another aim of the invention to build a cheap and, in addition, reliable watch movement that is controlled with a generator and in which these wear problems do not occur.

BRIEF SUMMARY OF THE INVENTION

According to the invention, these aims are achieved by means of a microgenerator having the characteristics of the characterizing part of claim 1, preferred embodiments being further indicated in the dependent claims.

These aims are achieved specifically by understanding the phenomenon that causes the rapid wear.

The aforementioned problem was solved in particular by discovering a totally unexpected effect in such watch movements and by inventing solutions to prevent this effect.

Empirical Background and Solutions Proposed

The essential difference between a mechanical watch movement and a generator watch movement lies in the electric grounding of the components. In a conventional mechanical clock, the balance is electrically grounded directly over the spring coil. In a watch movement with a microgenerator, the rotor 10 of the generator should also be grounded electrically over the train 50, 51, 60, 61, 70, 71. But, as measurements have shown, this is surprisingly not the case: the rotor is insulated from the plate of the watch movement.

The explanation found in the framework of this invention for this surprising fact is the following: as the driving torque at the generator is very small and the magnets 12 of the rotor stray fields, the axis 50 of the wheel 51 driving the rotor may not be magnetic. Otherwise, the rotor receives a positioning torque substantially greater than the driving torque available to the generator, which causes the generator to stop. To prevent this, the axis in question is made of copper-beryllium (CuBe). This solution has already been described in the above-mentioned application EP0851322. Copper-beryllium however has the tendency to develop layers of oxide. If this oxide layer is thick enough and the surface pressure in the gearing is small, the rotor 10 as well as the wheel 51 and the pinion 50 (Inter2) driving the rotor can be electrically insulated from the rest of the watch movement.

On the other hand, if the generator 10, the pinion 50 and the wheel 51 are electrically insulated from the other parts of the watch movement, they can be charged electrically through frictional electricity and/or through the rotor's stray fields that induce a voltage in the wheel 50–51. As soon as the voltage has reached a certain value, there can be a discharge of sparks, as described below, which can lead to a more rapid wear of the gear train and a rapid deterioration of the lubrication.

The insulated wheels and the rotor can be charged especially through frictional electricity. If two surfaces are in contact and then separate, electrons will be torn from one of the surfaces, with the result that one body has a negative and the other a positive charge. If the bodies are not electrically insulated from one another, the charges will simply be exchanged again at the next contact.

If on the other hand the bodies are insulated from each other, for example by a layer of oxide, these charges cannot be exchanged, so that the bodies will be charged.

Charges with the same polarization repel mutually, leading to the charges being at maximum distance from each other. Because the separation of the charge occurs on the little pinion, the charges have the possibility of spreading onto the big wheel, so that the pinion is no longer charged and can be recharged at the next separation. The well-known Van den Graaf generator works according to this principle. In this manner, a charging pump results that deposits the charges on the rotor 10. If it is assumed that the engagement between the rotor 10 and wheel 51 yields about 7,000,000 meshings and between the pinion 50 and the wheel 61 about 1,000,000 meshings per day, it is evident that in this way considerable voltages build up.

As soon as the voltage developed in this fashion is bigger than the breakdown voltage of the insulation layer, there is an exchange of charge. Depending on the voltage, a spark discharge may occur.

If then the rotor 10 is electrically insulated from the rest of the watch movement, as demonstrated by measurements of the electric resistance between the plate 30 and the rotor 10, it is charged, either through air friction, through charge separation as described further above or through the voltage induced in the wheel 50–51 by the magnetic stray fields of the rotor 10.

If the voltage built up through friction electricity and/or through the rotor's stray fields is too big for the electric insulation, there are discharges. This can be spark discharges in the meshing or there can be other discharges, for example directly between the rotor 10 and the plate 30. These discharges cause the following damage in the watch movement:

There is a lot of abrasion at the teeth cusps of the wheel 61 (Inter 1), the teeth cusps are heavily damaged, though these teeth cusps are never in contact with teeth of the other wheel.

On the pinion 50 (Inter 2), quite a thick layer of oxide develops. Here, too, the teeth cusps are partially destroyed. Furthermore, there are traces of abrasion on the teeth flanks.

The oil of Inter (60–61), Inter 2 (50–51) and generator 10 is deteriorated, on the one hand by the formation of ozone, on the other hand by the high electric voltage and the spark discharge.

In the bearings 41, there are traces of abrasion and the oil is full of small particles.

The teeth of the wheel are soiled with abrasion particles.

The pegs are heavily worn out because of the particles in the oil.

The different chemical substances in the oil attack the pegs chemically.

The electronics 81 may possibly be disturbed by the discharges.

These problems occur only after a certain time, but if they do, the watch movement stops after a short time. Once there are spark discharges, the layer of oxide grows, as does the tendency to charge the wheels through frictional electricity, and the damages continue with ever growing intensity. After a short time, the friction caused by the deteriorated oil and the dirt in the jewel bearings is so great, that the driving force available at the generator is smaller that the needed driving force, so that the regulation does not function any more.

These experiments according to the invention were carried out under a scanning electron microscope in order to check whether the wheels in the train can be charged. In this process, an electron beam is focused on the rotor 10. If the rotor can be charged, it means that it is not grounded over the train 50, 51, 60, 61, 70, 71 of the plate 30, i.e. it is not insulated from the plate.

Spark discharges could be observed in the scanning electron microscope, which demonstrates that the rotor 10 is electrically insulated. The damage visible on the wheels in the train looks very similar to the damage that happens in watches after a wear test of several months.

In order to solve the problem of the watch movements with a microgenerator according to the state of the art, the gearing is grounded, in a first embodiment of the invention. Thus, an electric charging of the rotor and of the gearing is avoided. It is for example possible to ground the gearing over the meshing or over the axes, for example in the bearings or by means of brush contacts on the axes.

In a second embodiment of the invention, which may be combined with the first embodiment, charge separation is prevented. The occurrence of charge separation can for example be avoided by using materials that have approximately the same electrochemical potential and/or the same dielectric constant. If the materials that are in contact with each other possess approximately the same surface characteristics, the tendency of electrons being torn away when there is a separation of the materials is not very high. Therefore, materials or surfaces with good tribological characteristics and a hardness greater than 200DH can for example be used.

In a third embodiment of the invention, which may be combined with the first and/or second embodiment, oil that is resistant to ozone is used. This allows for the lubrication to be kept intact, if within the watch movement ozone is regularly produced by spark discharges.

In a fourth embodiment of the invention, which may be combined with the first and/or second and/or third embodiment, jewel bearings are used that protect the oil as much as possible against oxidation. This is achieved by keeping the jewel bearings as closed as possible, on the one hand in order to keep the oil in the bearings by capillary effect and, on the other, in order that the oil is thus not exposed to oxygen and the possible ozone it contains.

DESCRIPTION OF THE DRAWINGS

The invention will be better understood with reference to the description of an embodiment illustrated by the attached drawings containing the figures, in which.

DETAILED DESCRIPTION OF THE INVENTION

Figure 1:
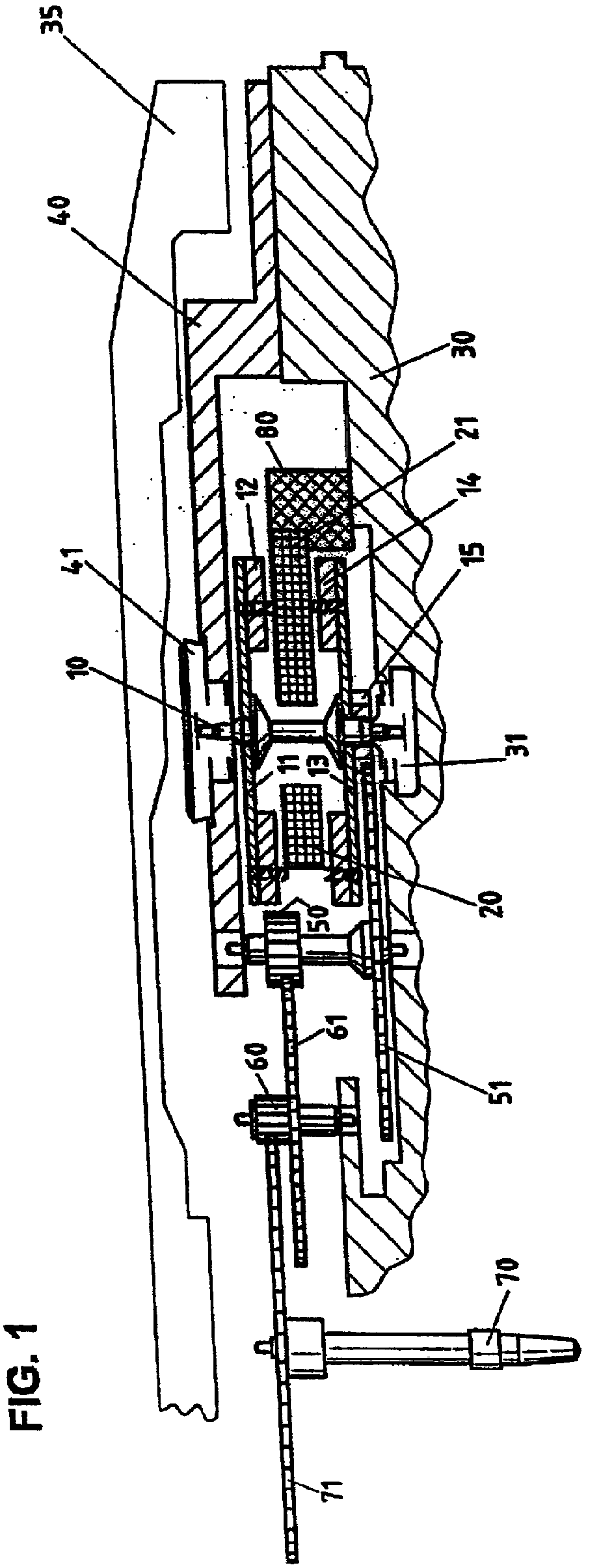
FIG. 1 shows a cross section of a part of the gearing and of the microgenerator of a watch movement.

FIG. 1 shows a side cut of a microgenerator fitted in a watch movement according to the invention, with only the parts of the watch movement necessary for understanding the invention being shown. The watch movement contains a mechanical energy storage in the form of a (not represented) spring. The spring is wound by a (not represented) winding device or preferably by a mass that is put into oscillation by the movements of the watch wearer's arm. The spring drives the various hands and displays of the watch, especially the seconds hand that is fastened on the seconds axis 70 over a (not represented) conventional gearing.

The seconds wheel 71 fitted on the seconds axis 70 drives a first intermediate pinion 60 (Inter 1) that in turn over the first intermediate wheel 61 drives a second intermediate pinion 50 (Inter 2). The first intermediate pinion 60 as well as its axis consist for example of steel or another suitable metal; the second intermediate pinion 50 and its axis, in contrast, consist of a non-magnetizable material, preferably a copper-beryllium alloy, to avoid a positioning torque to be exerted on the generator because of the force of the magnet s on the intermediate wheel.

The second pinion 50, in turn, drives the axis 10 of the generator's rotor over the second intermediate wheel 51 and the pinion 15. The axis 10 is held rotating between two synthetic shock-absorbent bearings 31 and 41. The first shock-absorbent bearing 31 is connected to the plate 30 of the watch movement, whereas the second shock-absorbent bearing 41 is connected with a bridge 40.

The rotor consists of an upper disk 11 and a lower disk 13 that are connected firmly with the axis 10. The lower surface of the upper disk 11 in this example contains six single magnets 12 that are arranged at regular intervals close to the periphery of the disk. The upper surface of the lower disk 13 is fitted in the same manner with six single magnets 14 that are arranged symmetrically to the six magnets of the upper disk.

The stator contains three induction coils 20, 21, 22, that are mounted between the disks 11 and 13. The generator is mounted between the plate 30 of the watch movement and a bridge 40, which allows for the complete generator inclusive of the coils to be concealed.

Figure 2:
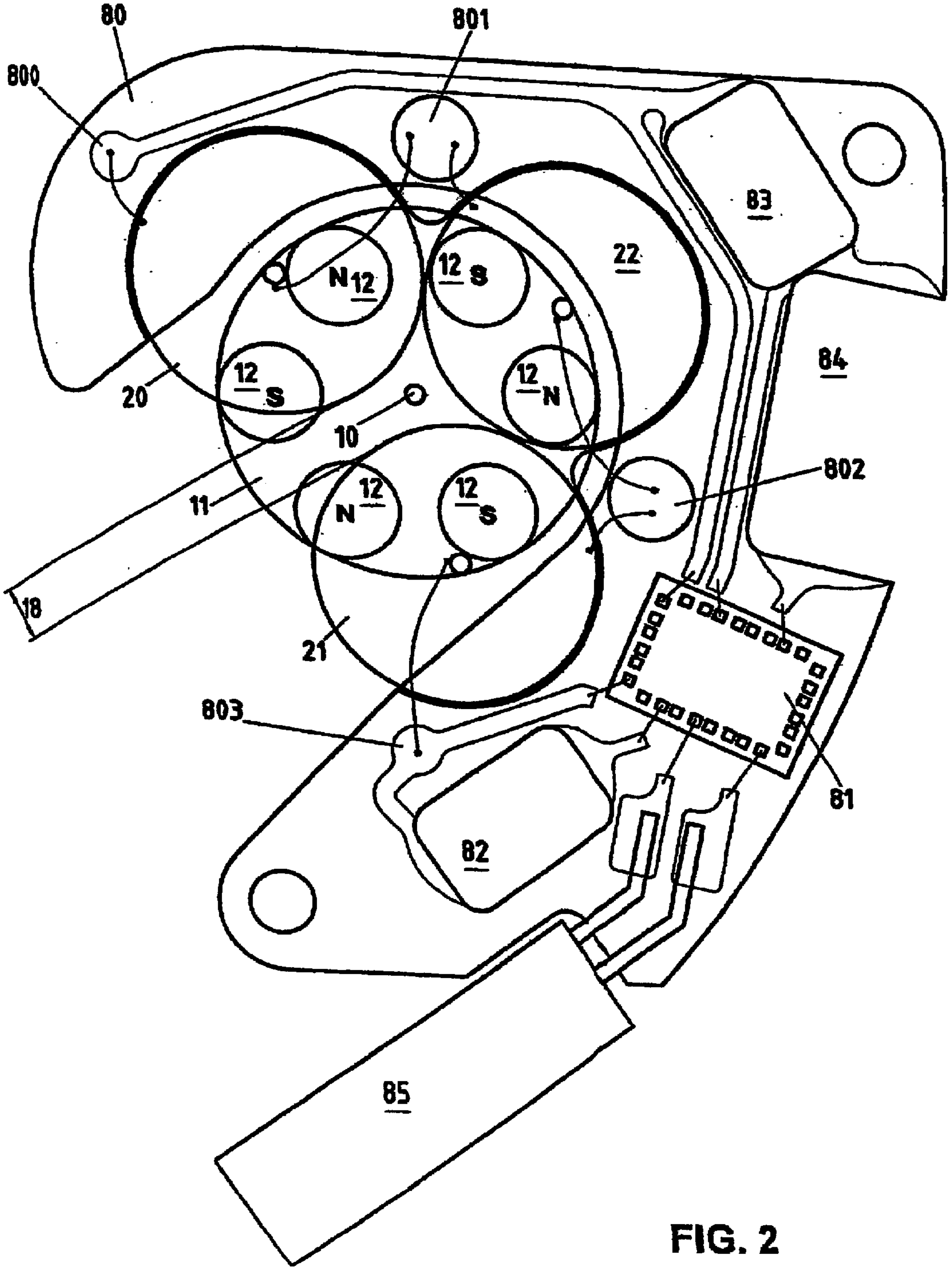
FIG. 2 shows a top view of a module fitted with a microgenerator and the associated electronics.

FIG. 2 shows a top view of the module 80 fitted with a microgenerator. The three coils 20, 21, 22 of the microgenerator's stator are mounted on the module 80 and linked serially between the points 800 and 803 of the electronic module 80. An integrated circuit 81 is mounted on the module 80. The purpose of this integrated circuit is to monitor the rotation speed of the microgenerator and to regulate this speed by changing the value of a variable load resistance which can be exerted on the microgenerator.

As explained above, a layer of oxide can develop on the wheel 51 and the pinion 50 from the copper-beryllium which insulates these wheels electrically from the other wheels 61, 71 and from the plate 30. This problem occurs especially with watch movements with a microgenerator, because the forces between the wheels and hence the surface pressure in the meshing is very small so that there is no good electric contact between the wheels. Although the forces in a mechanical watch are of a similar magnitude, in this case the balance, regulating the rotational speed, is electrically connected over the spiral coil with the plate so that it can not charge.

Through the mechanism as explained above, charges accumulate in the wheels and pinions and in the rotor 10, which can cause spark discharges. These spark discharges wear down the wheels and the oil in the watch movement deteriorates because of the ozone that is generated by the spark discharges. Furthermore, the spark discharges interfere with the regulating circuit 81 so that the watch movement is no longer correctly regulated.

To avoid these problems, according to a first embodiment of the invention at least a part of the wheels 51, 61, 71, and pinions 50, 60, 70 are grounded. For the wheels one uses preferably materials or layers with very good electric contact characteristics so that no strong surface pressure is necessary to secure a good electric contact.

According to a second embodiment of the invention, the occurrence of charge separation is avoided by using in the gearing materials which posses approximately the same electrochemical potential and/or the same dielectric constant. If the materials that are in contact with each other possess approximately the same surface characteristics, the tendency of electrons being torn away when there is a separation of the materials is not very high.

Preferably, then, a material or at least a surface is used for the wheels and pinions 50, 51, 60, 61, 70 and/or 71 that avoids charge separation and at the same time also allows between the wheels an electronic contact at a weak surface pressure.

Preferably, a material is used which has good electric characteristics, on which no layers of oxide develop and which furthermore possesses good tribological characteristics. For example, wheels and pinions of cheaper material can be used, for example plastic, CuBe, aluminum, brass or steel (for wheels and pinions that are not influenced by the magnetic field of the rotor), which can then be covered with a carefully chosen material. The thickness of the layer is preferably less than 1 $\mu$m, the hardness greater than 200DH, the coating material may not be magnetic and has to adhere well onto the basic material. Furthermore, a combination of materials has to be used in which the basic material of the wheels is not diffused into the coating. The coating can consist for example of gold, a gold alloy or electrically conductive oxides. One can, however, also use wheels and pinions made completely of gold, silver, of an electrically conductive material, of ceramicor, of an electrically conductive plastic material or any similarly well conductive material.

In order to have a good electric contact, the meshing of the wheels and pinions may not be epilamized, because epilam acts as an insulator.

According to the invention, the gearing can also be grounded through the axes. Normally, rubies, which are good electric insulators, are used for the bearing of axes in the watch industry. In an embodiment of the invention, a material 41 is used for the bearing which has good tribological characteristics but is also electrically conductive. Thus, the gearing can also be grounded over the bearing.

In a preferred embodiment of the invention, a lubricat is used in the bearings, for example in the form of an electrically conductive grease or oil to make it possible to ground the gearing over the bearings.

According to the invention, the oil used is furthermore ozone resistant, so that the lubrication stays unaltered for longer, even in the case of spark discharges. A dry-film lubrication can also be used, or a mixture of oil and dry-film lubrication.

In a preferred embodiment of the invention, jewels or rubies are used that protect the oil as well as possible against oxidation by oxygen or ozone. This is achieved by keeping the jewel bearings as closed as possible, on the one hand in order to keep the oil in the bearings by capillary effect and, on the other, in order that the oil is thus not exposed to oxygen and the possible ozone it contains.

If a normal horologic oil is to be used, there is still the possibility of using for the bearings special jewel bearings that are constructed in such a way as to protect as much as possible the oil against oxidation from all sides. Such bearing elements can be used among others for the generator, the Inter 2 and the Inter 1. Tests have been conducted for example with the Duofix, Duobil and Duokif jewel bearings of the company KIF Parechoc AG that contain cap jewels which keep the oil in a nearly closed space. Compared to the jewel bearings usually used, such bearings, thanks to the capillary effect, have the advantage that the oil stays better in the bearings and has fewer tendencies to spread.

Thus, oils having a not too great surface tension may be used, such as for example perfluorinated oils like Fomblin Z 25.

The present invention also concerns a test method that can check whether the wheels in a watch movement are grounded. With this test method, various materials and coatings can be tested. The working watch movement to be tested is bombarded with electrons in a scanning electron microscope. The parts that are not grounded will then be charged. If certain parts, for example the rotor and the pinions/wheels 50/51 are electrically insulated from the plate or other components, these parts will be charged until the voltage at any place in the train is high enough to cause a spark discharge. At this place, a slight damage will occur. In this way, it can be determined whether the wheels are grounded. If the watch movement works perfectly well for a certain time in the scanning electron microscope and no damage can be found at the wheels after this test, it means that the wheels are electrically connected with each other.

In another embodiment of the test method, an electric charge is deposited without contact on the rotor. During this, a high tension source is connected to the watch movement by connecting one pole to the plate 30 and the other pole as closely as possible to the rotor 10, 11, 13. If then a spark discharge occurs on the rotor, the rotor will be electrically charged. If the rotor and the train are electrically grounded, the charges are spread out in the watch movement and there is no reason for a spark discharge between the meshed wheels. Therefore, there should be no damage visible on the wheels. However, should the dented wheels not be electrically well connected with each other, a spark discharge can take place in the meshing. In this case, the wheels will be damaged.

In another embodiment of the method, the resistance between the rotor and the plate is measured. To do this, the spring must be wound so that the wheels are meshed and the surface pressure in the meshing corresponds more or less to the surface pressure necessary for normal operation. The rotor may not however be subjected to strong mechanical force to avoid anti-shock elements being ejected and the rotor's axis being electrically connected to the plate. It is best to use a thin wire to contact the rotor for the measurement. To do this, the rotor has to be brought to a standstill by contact with the wire.

The present invention also concerns watches that were tested with this method.

What is claimed is:

1. Watch movement in which the rotor of a generator is driven by a spring over a plurality of wheels and pinions, the operation of the generator being regulated by an electronic regulating circuit, wherein said wheels and pinions are electrically grounded.

2. The watch movement of claim 1, wherein at least certain of said wheels and pinions are made of non-magnetizable material.

3. The watch movement of claim 2, wherein at least the wheel and/or the pinion that meshes into said rotor are made of non-magnetizable material.

4. The watch movement of claim 3, wherein said non-magnetizable material comprises copper-beryllium (CuBe).

5. The watch movement of claim 2, wherein at least certain of said wheels and/or pinions are made of electrically well conductive material.

6. The watch movement of claim 5, wherein said material is an electrically conductive oxide.

7. The watch movement of claim 5, wherein said material is gold.

8. The watch movement of claim 5, wherein said material is an electrically conductive plastic.

9. The watch movement of claim 1, wherein at least one of said wheels and/or pinions are provided with a coating.

10. The watch movement of claim 9, wherein said coating is electrically conductive.

11. The watch movement of claim 9, wherein said coating is not magnetic.

12. The watch movement of claim 9, wherein said coating is not oxidable.

13. The watch movement of claim 9, wherein said coating has a hardness greater than 200DH.

14. The watch movement of claim 9, wherein the thickness of said coating is less than 1 $\mu$m.

15. The watch movement of claim 9, wherein said coating consists of gold or a gold alloy.

16. The watch movement of claim 9, wherein said coating consists of an electrically conductive oxide.

17. The watch movement of claim 1, wherein at least one meshing is not epilamized.

18. The watch movement of claim 1, wherein said wheels and pinions are grounded over the meshing.

19. The watch movement of claim 1, wherein said at least one of the wheels and/or pinions are not epilamized.

20. The watch movement of claim 1, wherein materials for said wheels and pinions are used which possess approximately the same electrochemical potential and/or the same dielectric constant.

21. The watch movement of claim 1, wherein at least one of said wheels and pinions is grounded over the axes.

22. The watch movement of claim 21, wherein said axes are grounded over the jewel bearings.

23. The watch movement of claim 22, wherein said jewel bearings use an electrically conductive oil.

24. The watch movement of claim 21, wherein said axes are grounded by means of sliding contacts.

25. The watch movement of claim 1, wherein in the watch movement an ozone-resistant oil is used.

26. The watch movement of claim 1, wherein a dry-film lubrication is used in the watch movement.

27. The watch movement of claim 1, wherein it was tested beforehand to check whether certain parts of the watch movement are grounded.

28. The watch movement of claim 1, wherein it contains bearings that protect the oil against oxidation.

29. Watch movement in which the rotors of a generator is driven by a spring over a plurality of wheels and pinions, the operation of the generator being regulated by an electronic regulating circuit, wherein at least certain of said wheels and pinions are electrically grounded, and wherein at least certain of said wheels and pinions are made of non-magnetizable material.

30. Watch movement in which the rotor of a generator is driven by a spring over a plurality of wheels and pinions, the operation of the generator being regulated by an electronic regulating circuit, wherein said regulating circuit changes the load imposed on said generator, and wherein in the watch movement an oil is used that is ozone-resistant.

31. Watch movement according to claim 30, wherein said generator is driven by a wheel and a pinion made of non-magnetizable material and whose meshing are not epilamized.

* * * * *